United States Patent
Cho

(10) Patent No.: US 8,028,053 B2
(45) Date of Patent: Sep. 27, 2011

(54) SYSTEM AND METHOD FOR DEPENDENCY MANAGEMENT

(75) Inventor: Yong-jin Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 954 days.

(21) Appl. No.: 11/234,515

(22) Filed: Sep. 26, 2005

(65) Prior Publication Data

US 2006/0085365 A1 Apr. 20, 2006

(30) Foreign Application Priority Data

Sep. 24, 2004 (KR) .................. 10-2004-0077198

(51) Int. Cl.
*G06F 15/16* (2006.01)
(52) U.S. Cl. ........ 709/223; 719/316; 707/622; 707/921; 707/922; 707/960
(58) Field of Classification Search .................. 709/223; 719/316; 707/622, 921, 922, 960
See application file for complete search history.

(56) References Cited

U.S. PATENT DOCUMENTS

| | | | | |
|---|---|---|---|---|
| 6,260,058 | B1* | 7/2001 | Hoenninger et al. | 718/107 |
| 6,747,675 | B1* | 6/2004 | Abbott et al. | 715/740 |
| 7,681,203 | B2* | 3/2010 | Mandato et al. | 719/316 |
| 2002/0087734 | A1* | 7/2002 | Marshall et al. | 709/310 |
| 2003/0135582 | A1* | 7/2003 | Allen et al. | 709/217 |
| 2003/0182394 | A1 | 9/2003 | Ryngler et al. | |
| 2004/0117798 | A1* | 6/2004 | Newman et al. | 719/310 |
| 2005/0086264 | A1* | 4/2005 | Masuda | 707/104.1 |
| 2005/0157954 | A1* | 7/2005 | Dijk | 382/321 |
| 2005/0273715 | A1* | 12/2005 | Zukowski et al. | 715/708 |
| 2009/0150876 | A1* | 6/2009 | Krebs | 717/165 |

FOREIGN PATENT DOCUMENTS

| | | |
|---|---|---|
| JP | 2002-334030 A | 11/2002 |
| JP | 2003-216859 A | 7/2003 |
| KR | 2002-0003394 A | 1/2002 |
| KR | 2003-0055282 A | 7/2003 |

OTHER PUBLICATIONS

Hegering et al., M. Brunner and A. Keller (Eds.): DSOM 2003, LNCS 2867, pp. 246-259, 2003.*
Cervantes, H. and Hall, R.S., "Automating Service Dependency Management in a Service-Oriented Component Model," Proceedings of the 6th Workshop on Component-Based Software Engineering, May 2003, pp. 1-5.*
Covington et al., A Context-Aware Security Architecture for Emerging Applications, 18th Annual Computer Security Conference (ACSAC '02), pp. 1-10, 2002.*
Ranganathan et al., M. Endler and D. Schmidt (Eds.): Middleware 2003, LNCS 2672, pp. 143-161, 2003.*

* cited by examiner

*Primary Examiner* — Cheyne Ly
(74) *Attorney, Agent, or Firm* — Sughrue Mion, PLLC

(57) ABSTRACT

A system and method for dependency management are provided. The system for dependency management, includes a provider object management module managing a provider object that provides information, a consumer object management module managing a consumer object that executes a predetermined task based on the information provided by the provider object, an information object management module managing an information object that manages the provider object and the consumer object based on the information, a dependency storage module storing dependency information between the provider object and the consumer object, and a dependency management module examining dependency between the provider object and the consumer object based on the dependency information that is received from the dependency storage module and controlling activation and deactivation of the provider object and the consumer object according to a result of the dependency examination.

21 Claims, 9 Drawing Sheets

SYSTEM AND METHOD FOR DEPENDENCY MANAGEMENT

CROSS-REFERENCE TO RELATED APPLICATION

This application claims priority from Korean Patent Application No. 10-2004-0077198 filed on Sep. 24, 2004 in the Korean Intellectual Property Office, the disclosure of which is incorporated herein by reference in its entirety.

BACKGROUND OF THE INVENTION

1. Field of the Invention

The present invention relates to a system and method for dependency management, and more particularly, to a system and method for dependency management, by which a consumer object having a lack of provider objects is not activated and a provider object that is not used by a consumer object is not activated, thereby minimizing resource dissipation and increasing the performance of the system.

2. Description of the Related Art

In a system including a consumer object which performs a predetermined task based on predetermined information or data and a provider object which provides the information or data used by the consumer object, mutual dependency may be established between the consumer object and the provider object. In other words, the consumer object cannot perform the task without the information or data provided by the provider object. Thus, the consumer object may be a dependent object and the provider object may be an object depended on by the consumer object. Generally, the consumer object and the provider object can be created, extinguished, activated, or deactivated independent of each other. Here, the consumer object may be activated even when the serviceability of the consumer object cannot be confirmed due to a lack of provider objects or the provider object may be activated and operate even when the consumer object depending on the provider object is not activated.

Activation of unnecessary objects incurs resource dissipation. In addition, since the system operates to manage the unnecessarily activated objects, the performance of the system is degraded. Therefore, a system for managing dependency between objects having mutual dependence is desired.

SUMMARY OF THE INVENTION

The present invention provides a system and method for dependency management, by which activation and deactivation of objects having mutual dependence therebetween is managed, thereby preventing resource dissipation and increasing system performance.

The above stated object as well as other objects, features and advantages, of the present invention will become clear to those skilled in the art upon review of the following description, the attached drawings and appended claims.

According to an aspect of the present invention, there is provided a system for dependency management. The system includes a provider object management module managing a provider object that provides information, a consumer object management module managing a consumer object that executes a predetermined task based on the information provided by the provider object, an information object management module managing an information object that manages the provider object and the consumer object based on the information, a dependency storage module storing dependency information between the provider object and the consumer object, and a dependency management module examining dependency between the provider object and the consumer object based on the dependency information that is received from the dependency storage module and controlling activation and deactivation of the provider object and the consumer object according to a result of the dependency examination.

According to another aspect of the present invention, there is provided a system for dependency management, including a sensor management module managing a sensor that observes knowledge, a context-aware service object (CAS) management module managing a CAS that provides a service when the knowledge satisfies a context corresponding to information determining a service action of the CAS, an observation information management module managing observation information which is a target of the knowledge and managing the sensor and the CAS based on the observation information, a dependency storage module storing dependency information regarding a relationship between the observation information and the context, and a dependency management module examining dependency between the observation information and the context based on the dependency information received from the dependency storage module and controlling activation and deactivation of the sensor and the CAS according to a result of the dependency examination.

According to still another aspect of the present invention, there is provided a method for dependency management, including examining dependency between a consumer object to be activated and a provider object providing information used by the consumer object, and controlling activation and deactivation of the consumer object and the provider object according to a result of the examination.

According to a further aspect of the present invention, there is provided a method for dependency management, including inspecting whether information used by a consumer object to be deactivated is used by any other consumer object, and when any other consumer object using the information does not exist, deactivating the provider object providing the information.

According to a further aspect of the present invention, there is provided a method for dependency management, including examining dependency of a consumer object that is in a resolved state among consumer objects using information provided by a provider object to be activated, and controlling activation and deactivation of the consumer object according to a result of the examination.

According to yet another aspect of the present invention, there is provided a method for dependency management, including examining dependency of a consumer object using information provided by a provider object to be deactivated, and controlling activation and deactivation of the consumer object and the provider object having dependence with the consumer object, according to a result of the examination.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF EXEMPLARY EMBODIMENTS OF THE INVENTION

Figure 1:
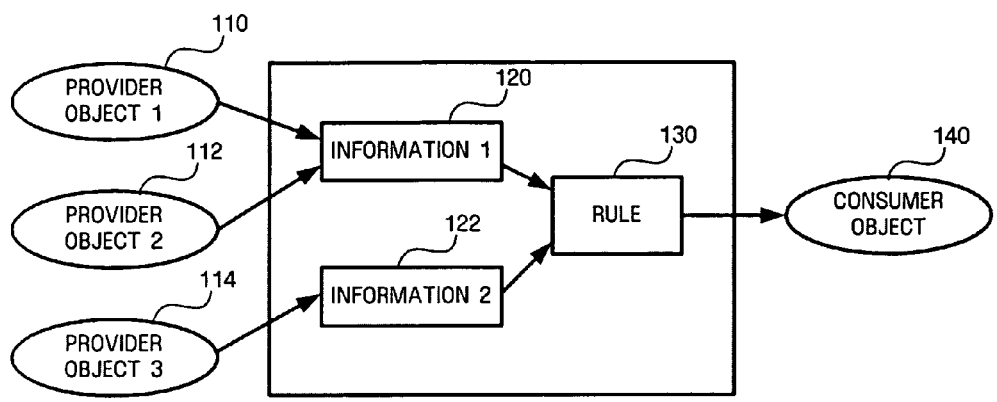
FIG. 1 is a diagram illustrating the concept of a system for dependency management according to an embodiment of the present invention.

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

The present invention will now be described more fully with reference to the accompanying drawings, in which exemplary embodiments of the invention are shown.

FIG. 1 is a diagram illustrating the concept of a system for dependency management according to an embodiment of the present invention.

A consumer object provides a service when a rule 130 is satisfied. Provider objects 110, 112, and 114 provide information 120 and 122 used to define the rule 130 for the consumer object 140. Since the rule 130 is defined by the information 120 and 122 provided by the provider objects 110 through 114, dependency is established between the consumer object 140 and the provider objects 110 through 114 via the information 120 and 122 and the rule 130.

Dependency management is a process of controlling activation or deactivation of a consumer object and a provider object which are mutually dependent on each other by not activating a consumer object when provider objects are deficient in providing information needed by the consumer object that determines a rule and not activating a provider object when a consumer object to use information provided by the provider object does not exist. A context-aware service framework in which service or non-service is determined based on context is an example of a framework including a consumer object and a provider object.

Here, the consumer object determines whether to provide a service based on information provided by the provider object and may be a context-aware service object (hereinafter, referred to as a CAS). The provider object provides information or data needed by the consumer object that determines service or non-service and may be a sensor that observes and provides knowledge used to determine a context of the CAS.

Such system for dependency management may be installed in a server so that a system corresponding to a provider object and a system corresponding to a consumer object can control activation or deactivation, or such system may be installed in a provider object system and/or a consumer object system to control activation or deactivation of each system based on dependency. For example, when a provider object system is an air conditioner that operates at an indoor temperature of at least 25° and a consumer object system is a temperature observing system that observes indoor temperature and provides an observed value, a system for dependency management may be installed in a separate server or in either the air conditioner or the temperature observing system and control the activation or deactivation of the air conditioner and the temperature observing system.

Figure 2:
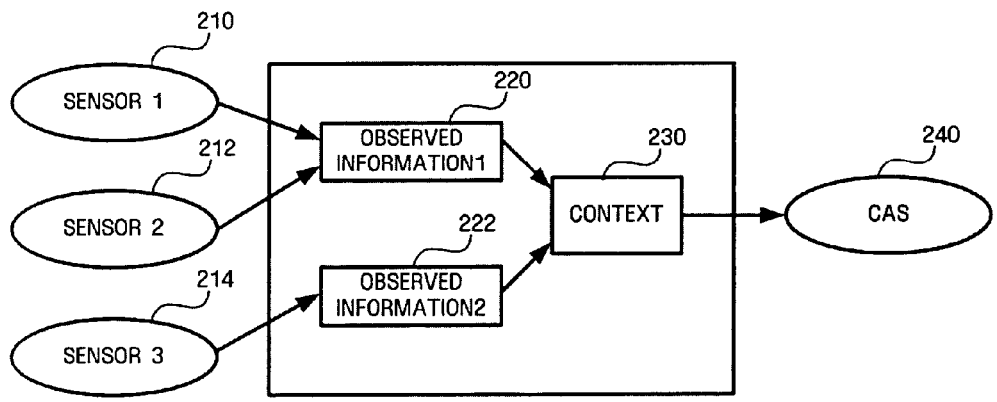
FIG. 2 is a conceptual diagram of a system for dependency management in a context-aware service.

FIG. 2 illustrates an example in which a system for dependency management is used in a context-aware service according to an embodiment of the present invention.

Sensors 210, 212, and 214 provide knowledge and have mutual dependency with a CAS 240 via observation information 220 and 222, which corresponds to a target of observation based on the knowledge, and a context 230.

In other words, since a context is determined by knowledge provided by sensors, dependency management can be performed as follows:

1. A CAS does not operate if all sensors are not secured:
   1) When sensors having dependence with the CAS are lacking, the CAS is not activated;
   2) When a dependency problem is solved by adding a sensor, the CAS is activated; and
   3) When a dependency problem occurs due to unregistration of a sensor, the CAS is deactivated, and 2. A sensor that is not used by a CAS does not operate:
   1) A sensor that is used by a CAS to be activated is activated; and
   2) A sensor that was used by a CAS to be deactivated is deactivated when it is not used by any other CASs.

In dependency management performed in a context-aware service, based on dependency between observation information observed by a sensor and a context determining the service of a CAS, the state of the sensor is managed in accordance with the start or stop of the CAS and the state of the CAS is controlled in accordance with registering or unregistering of the sensor. Hereinafter, for clarity of the description, dependency management in the context-aware service will be explained by way of an example.

Before setting forth exemplary embodiments of the invention, terms used in this specification will be briefly explained. It is to be understood that the following explanation of the terms is provided for a better understanding of the invention and is not restrictive of the invention.

Context

It denotes information that determines a service action defined by a context-aware service object (referred to as a CAS). The information determining a service action includes a time when a service is provided, information on whether to provide the service, an object to which the service is provided, a position to which the service is provided, etc. According to the characteristic of a service action determined by the context, the context is divided into when-context determining a time when a service is provided, why-context determining whether to provide a service, and how-context determining the content of a service. In a context-aware service, a service corresponding to the how-context is provided when the why-context is satisfied the moment the when-context is satisfied. The context is examined based on knowledge provided by a client object and is determined by a context-aware service framework.

Knowledge

It denotes all information that can characterize an entity situation. Entity is a person, a place, or a thing that is considered as being involved in the interaction between a user and an application program and includes the user and the application program. The knowledge may be a value such as temperature or humidity measured by a physical sensor and may be extended to general information, such as information on arrival/non-arrival of e-mail or Internet information. Accordingly, all service software may be referred to as context-aware service.

Context-Aware Service

It is a service the provision and content of which vary with a context defined by a service object. When it is determined based on knowledge provided by a client that why-context is satisfied the moment when-context is satisfied, a service is provided based on how-context. Accordingly, knowledge and context requested by a service may vary with an operating environment or a user's taste. For example, there is a context-aware service having a context "Start an air conditioner when temperature is not lower than 25°"", a context "temperature is not lower than 25°"" may be changed into "temperature is not lower than 28°"", "temperature is not lower than 25° and humidity is not less than 80%", or the like, according to a user's preference.

Figure 3:
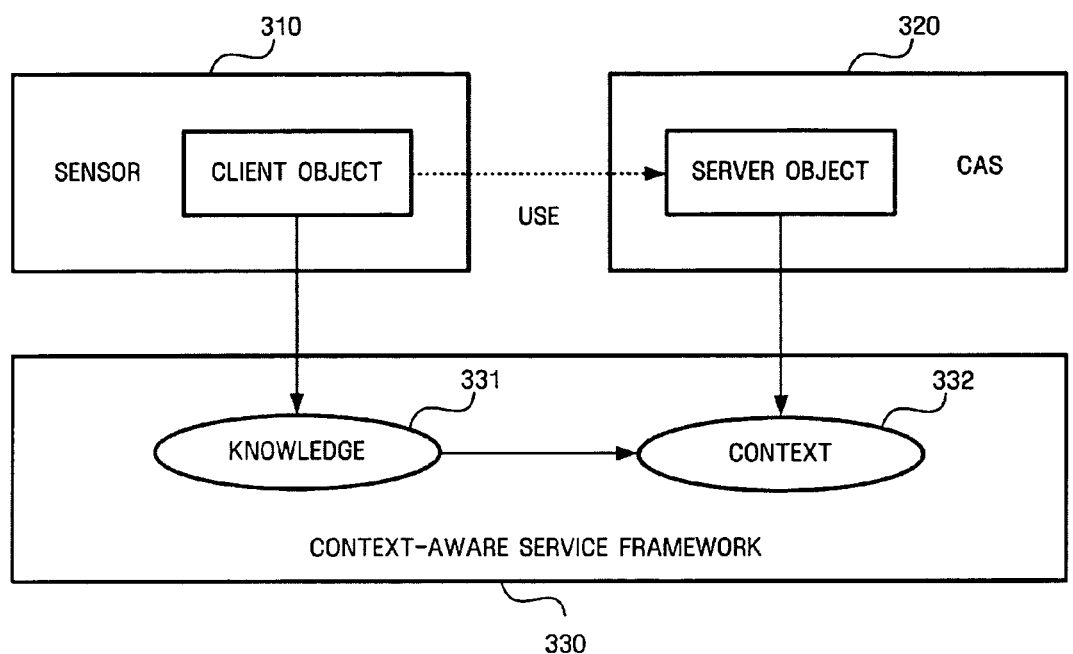
FIG. 3 is a schematic diagram of a context-aware service framework.

FIG. 3 is a schematic diagram of a context-aware service framework 330.

Context-aware service includes recognizing an operating situation, i.e., knowledge, determining a service action using the recognized knowledge, and executing a determined service. In the recognizing of the knowledge, at least one sensor 310, as a client object, observes knowledge 331. In the determining of the service action, whether a context 332 is satisfied is determined based on the knowledge 331. In the executing of the determined service, at least one CAS 320, as a server object, provides the service according to the content of the context 332. The recognizing of the knowledge may be shared by a plurality of CASs and the determining of the service action may be supported by the context-aware service framework 330 in a normal way.

The context-aware service framework 330 receives knowledge 331 from a sensor 310 and determines a context 332, thereby requesting a CAS 320 to provide a service. Accordingly, the sensor 310 and the CAS 320 are a client object and a server object, respectively, in an object-oriented middleware. Unlike a usual object-oriented middleware, the context-aware service framework 330 uses the server object (i.e., CAS) 320 by determining a context provided by the server object 320. In other words, the client object (i.e., sensor) 310 and the server object 320 are connected with each other through the knowledge 331 provided by the client object 310 and the context 332 requested by the server object 320. When the context 332 is determined based on the knowledge 331, the client object 310 uses the server object 320.

A context is determined based on knowledge provided by a plurality of sensors and information on an operating environment (such as common sense and a user's inclination) rather than simply based on knowledge provided by a single sensor. In other words, the sensor 310 and the CAS 320 have a loose connection in which they follow the determination made between the knowledge 331 provided by the sensor 310 and the context 332 requested by the CAS 320 by the context-aware service framework 330.

Figure 4:
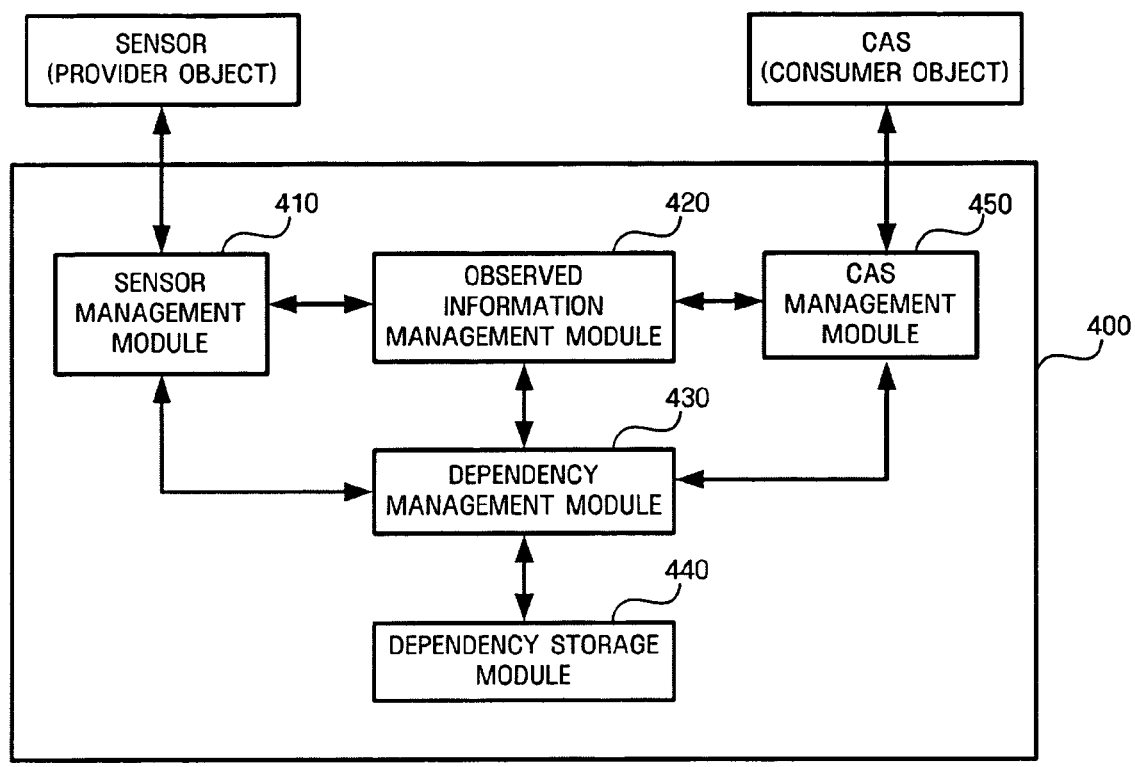
FIG. 4 is a block diagram of a system for dependency management according to an embodiment of the present invention.

FIG. 4 is a block diagram of a system 400 for dependency management according to an embodiment of the present invention.

The system 400 includes a sensor management module 410, a CAS management module 450, an observation information management module 420, a dependency management module 430, and a dependency storage module 440.

The term 'module', as used herein, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more computers in a communication system.

The sensor management module 410 is a manager that manages a sensor and processes the registration, unregistration, activation, and deactivation of a sensor. The CAS management module 450 is a manager that manages a CAS. The CAS management module 450 processes the registration, unregistration, start and stop of the CAS, and registers or unregisters a context provided by the CAS. The observation information management module 420 is a manager that manages an observation information object. The observation information management module 420 manages a sensor observing observation information and a CAS using the observation information based on the observation information.

The dependency storage module 440 stores information regarding dependency between the sensor and the CAS. The format of the information regarding the dependency (hereinafter, referred to as dependency information) will be described with reference to FIG. 11 later. The dependency management module 430 is a manager that manages the dependency between the CAS and the sensor. The dependency management module 430 examines the dependency when the CAS is registered, unregistered, started or stopped and when the sensor is registered or unregistered. The dependency management module 430 searches for the observation information object related with the CAS or the sensor based on the dependency information provided from the dependency storage module 440 and examines whether a dependency problem has occurred based on the observation information object. According to occurrence or non-occurrence of the dependency problem, the dependency management module 430 controls the sensor management module 410 and the CAS management module 450 to activate or deactivate the sensor and the CAS, respectively. A method of examining the dependency problem will be described with reference to FIGS. 5 through 10 later.

Figure 5:
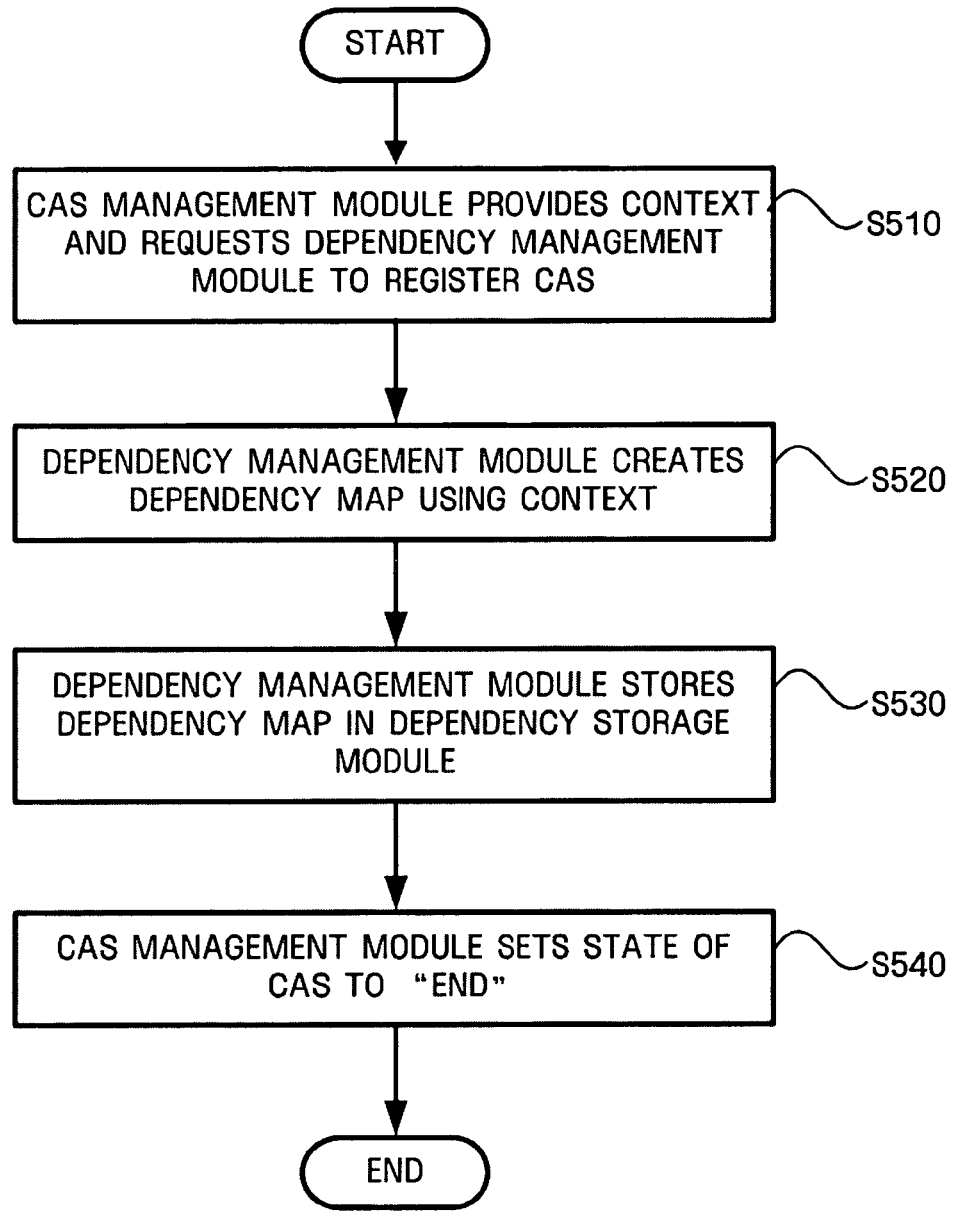
FIG. 5 is a flowchart of a procedure in which a context-aware service object (referred to as a CAS) is registered in a system for dependency management, according to an embodiment of the present invention.

FIG. 5 is a flowchart of a procedure in which a CAS is registered in the system 400 for dependency management, according to an embodiment of the present invention.

When the CAS management module 450 requests the dependency management module 430 to register the CAS in operation S510, the dependency management module 430 creates a dependency map indicating a relationship between a context and an observation information object using the context of the CAS in operation S520. The dependency map is stored in the dependency storage module 440 in operation S530. A method of creating the dependency map will be described with reference to FIG. 11 later. After the creation of the dependency map, the CAS management module 450 sets the state of the CAS to "Stop" in operation S540.

Figure 6:
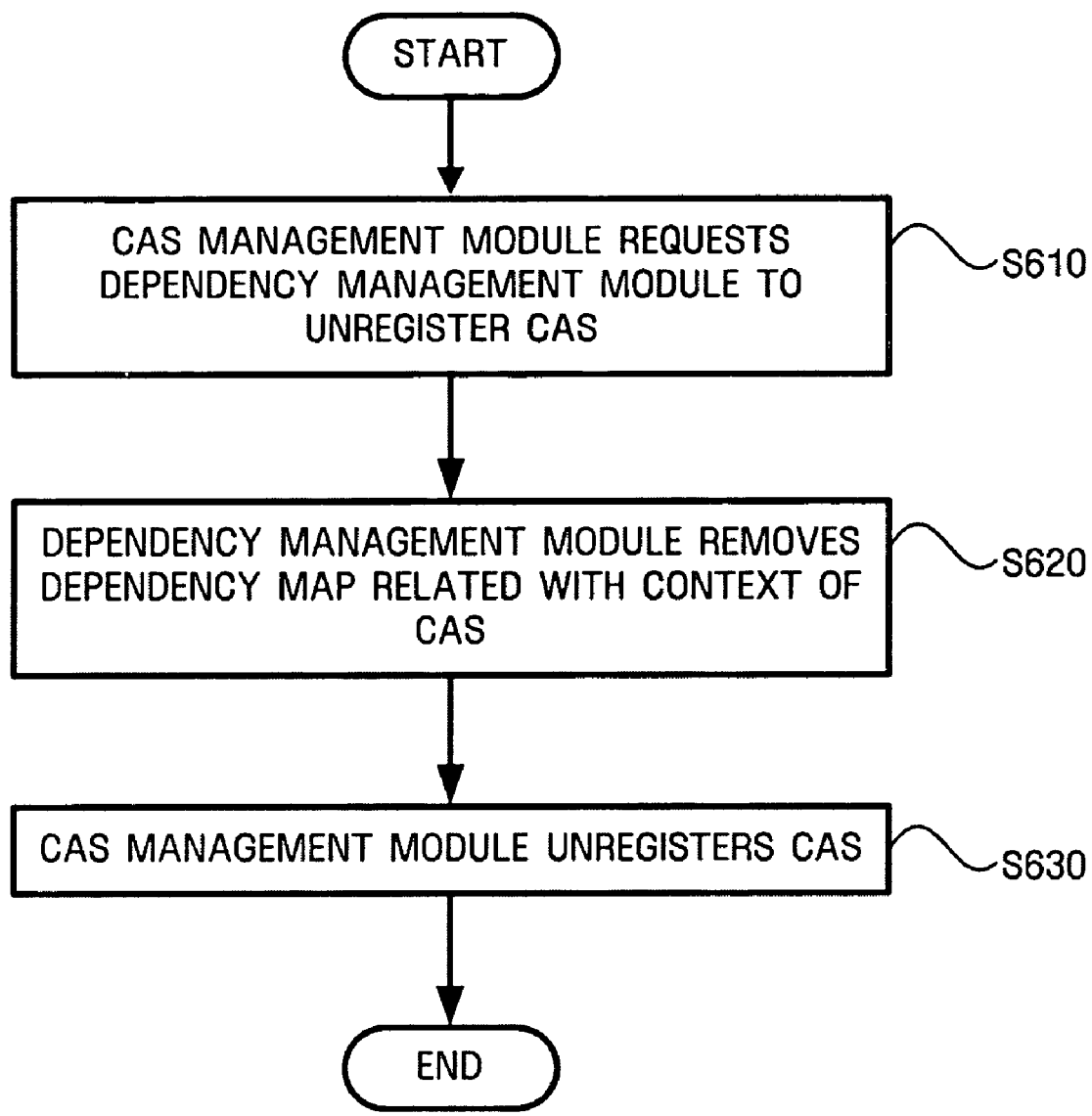
FIG. 6 is a flowchart of a procedure in which a CAS is unregistered in the system for dependency management, according to an embodiment of the present invention.

FIG. 6 is a flowchart of a procedure in which a CAS is unregistered in the system 400 for dependency management, according to an embodiment of the present invention.

When the CAS management module 450 requests the dependency management module 430 to unregister the CAS in operation S610, the dependency management module 430 removes a dependency map related with the context of the CAS requested to be unregistered from the dependency storage module 440 in operation S620. After the dependency map is removed, the CAS management module 450 unregisters the CAS in operation S630.

Figure 7:
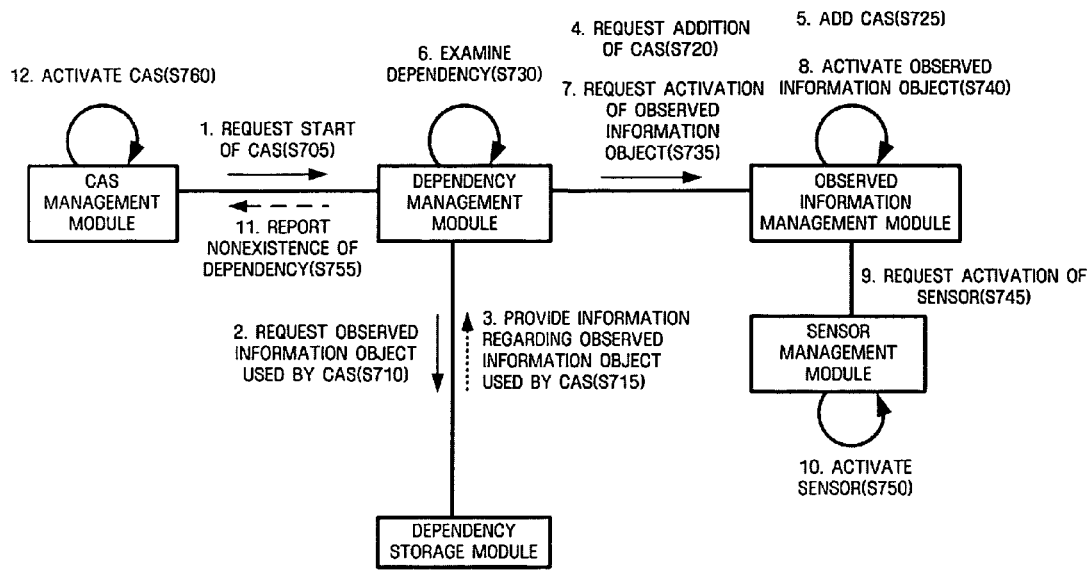
FIG. 7 is a flowchart of a procedure in which a CAS is started in the system for dependency management, according to an embodiment of the present invention.

FIG. 7 is a flowchart of a procedure in which a CAS is started in the system 400 for dependency management, according to an embodiment of the present invention.

The CAS management module 450 requests the dependency management module 430 to start the CAS in operation S705. The dependency management module 430 requests information regarding all observation information objects used by the CAS from the dependency storage module 440, in operation S710. The dependency storage module 440 searches a dependency map corresponding to a context of the CAS and provides the information regarding all observation information objects needed to determine the context to the dependency management module 430 in operation S715. The dependency management module 430 requests the observation information management module 420 to add the CAS as a user of all observation information objects in operation S720. The observation information management module 420 adds the CAS as a user of corresponding observation information in operation S725.

The dependency management module 430 examines dependency of the CAS to be started in operation S730. In other words, the dependency management module 430 examines whether all of sensors that observe observation information needed to determine the context of the CAS have been secured. The dependency management module 430 acquires dependency map information corresponding to the CAS from the dependency storage module 440 and inquires of the observation information management module 420 about whether a sensor that observes the observation information used by the CAS exists. When a dependency problem has not occurred (i.e., when all of the sensors that observe the observation information used by the CAS have been registered), the dependency management module 430 requests the observation information management module 420 to activate an observation information object corresponding to the observation information needed to determine the context of the CAS in operation S735. The observation information management module 420 activates the observation information object in operation S740 and requests the sensor management module 410 to activate a sensor that observes the activated observation information object in operation S745. The sensor management module 410 activates the sensor in operation S750 and dependency management module 430 reports to the CAS management module 450 that the dependency problem is not present in operation S755 so that the CAS management module 450 activates the CAS in operation S760.

However, when the dependency problem has occurred (i.e., when a sensor that observes the observation information used by the CAS has not been registered), the dependency management module 430 reports the occurrence of the dependency problem to the CAS management module 450. Then, the CAS management module 450 sets the state of the CAS to "Dependence" and terminates the procedure for dependency management.

Figure 8:
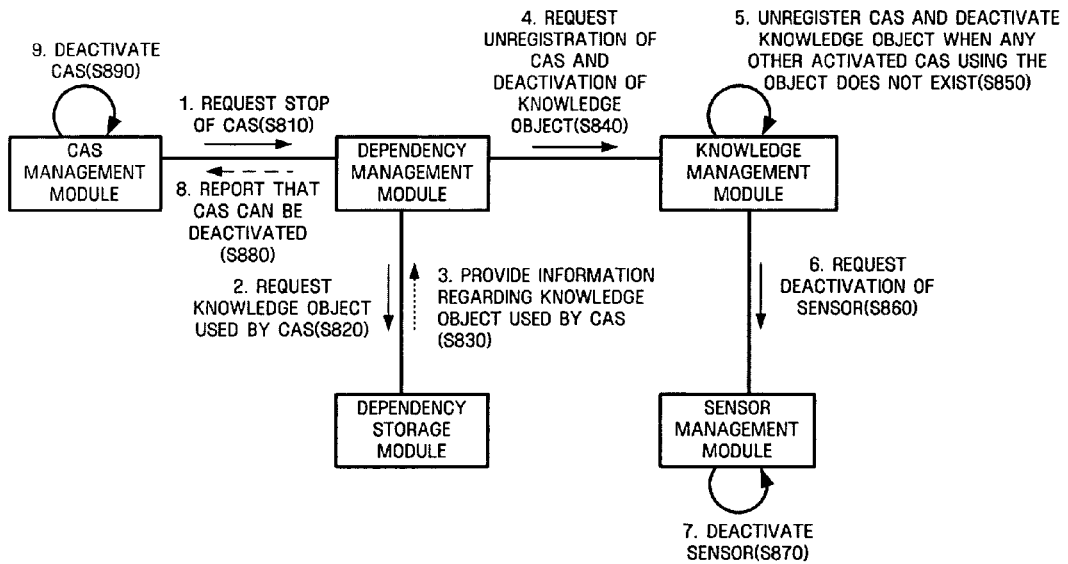
FIG. 8 is a flowchart of a procedure in which a CAS is stopped in the system for dependency management, according to an embodiment of the present invention.

FIG. 8 is a flowchart of a procedure in which a CAS is stopped in the system 400 for dependency management, according to an embodiment of the present invention.

In operation S810, the CAS management module 450 requests the dependency management module 430 to stop the CAS. The dependency management module 430 requests and acquires information regarding all observation information objects used by the CAS to be stopped from the dependency storage module 440 in operations S820 and S830. Then, the dependency management module 430 requests the observation information management module 420 to unregister the CAS and deactivate each observation information object used by the CAS in operation S840. Then, the observation information management module 420 unregisters the CAS and deactivates the observation information object used by the CAS when any other activated CAS using the observation information object does not exist in operation S850 and requests the sensor management module 410 to deactivate a sensor that observes knowledge corresponding to the deactivated observation information object in operation S860. The sensor management module 410 deactivates the sensor in operation S870. The dependency management module 430 reports to the CAS management module 450 that the CAS requested to be stopped can be deactivated in operation S880. Then, the CAS management module 450 sets the state of the CAS to an inactive state in operation S890.

Figure 9:
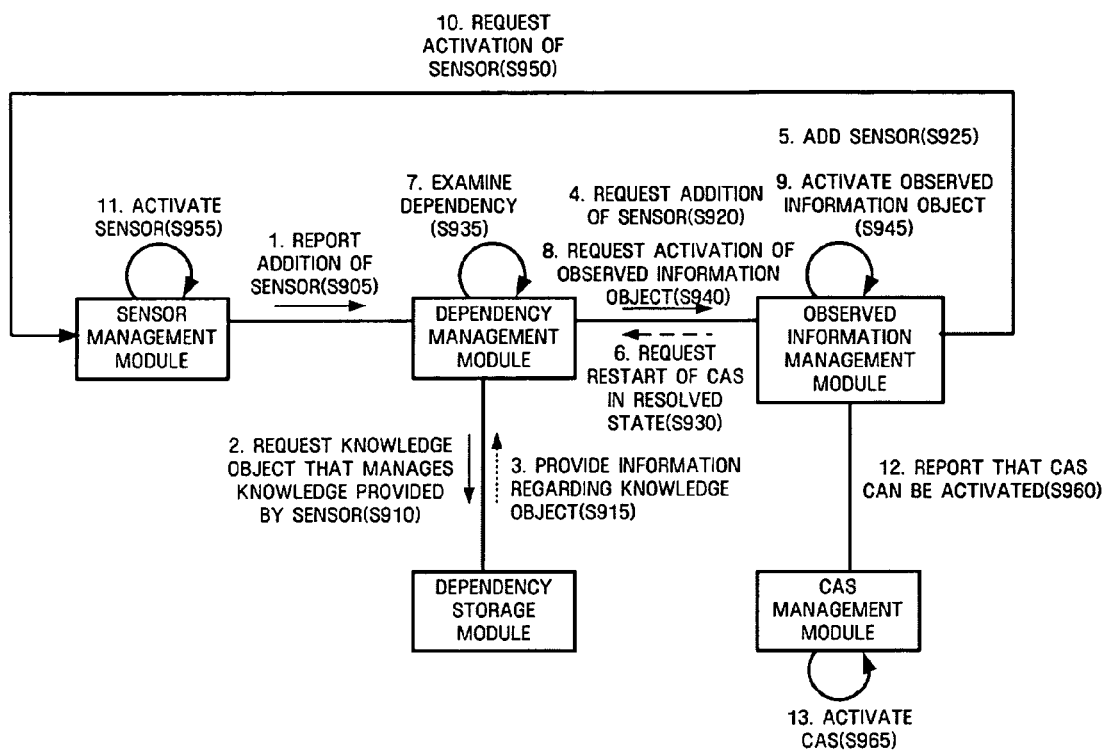
FIG. 9 is a flowchart of a procedure in which a sensor is registered in the system for dependency management, according to an embodiment of the present invention.

FIG. 9 is a flowchart of a procedure in which a sensor is registered in the system 400 for dependency management, according to an embodiment of the present invention.

When the sensor management module 410 reports to the dependency management module 430 that the sensor has been added in operation S905, the dependency management module 430 request and acquires information regarding a knowledge management object provided by the added sensor in operations S910 and S915. The dependency management module 430 requests the observation information management module 420 to add the sensor in operation S920. The observation information management module 420 adds the sensor to a corresponding observation information object in operation S925 and requests the dependency management module 430 to restart a CAS that is in a resolved state among CASs using the observation information object to which the sensor has been added in operation S930. The dependency management module 430 acquires a dependency map from the dependency storage module 440 and inquires the observation information management module 420 about whether all of the needed sensors have been registered to examine the dependency of the CAS requested to be restarted in operation S935. When a dependency problem has not occurred, the relevant observation information object is activated in operations S940 and S945 and the sensor is activated in operations S950 and S955. The observation information management module 420 reports to the CAS management module 450 that the CAS in the resolved state can be activated in operation S960. Then, the CAS management module 450 activates the CAS in operation S965. However, when the CAS in the resolved state, which has been requested to be restarted, has a dependency problem, the CAS is not activated but remains in the resolved state.

Figure 10:
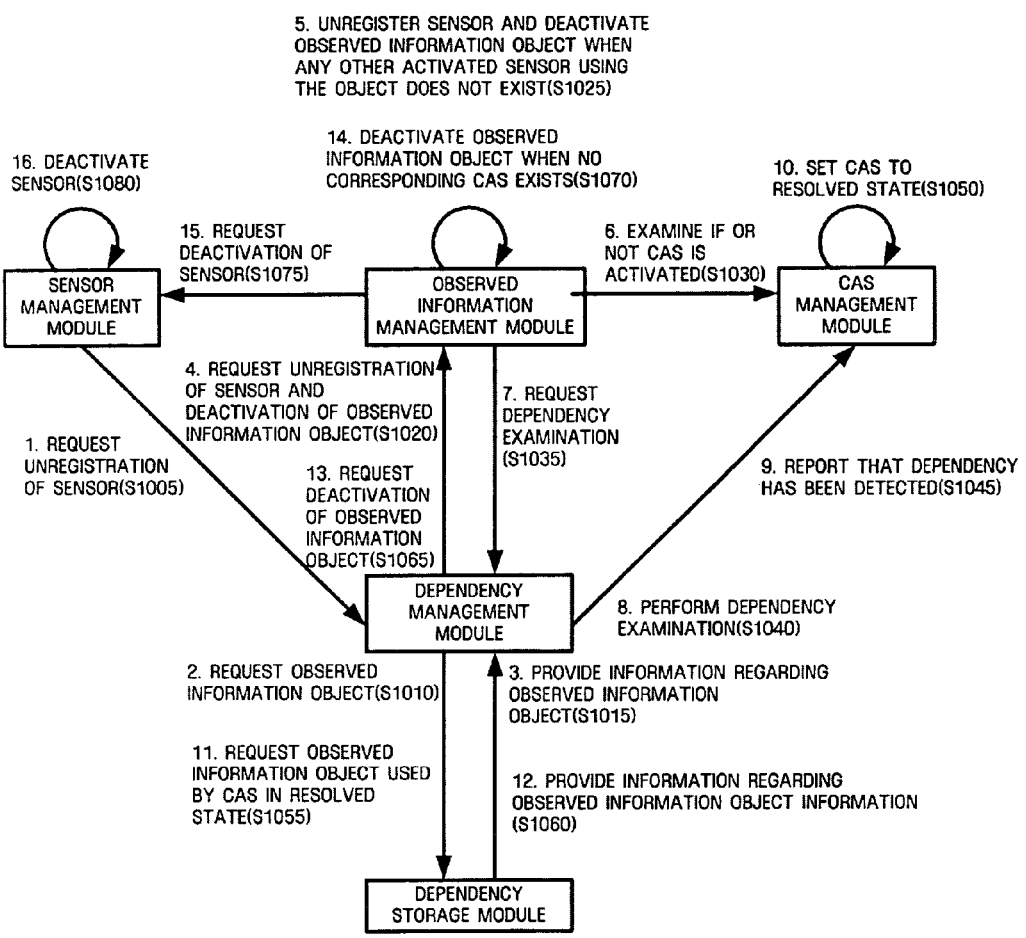
FIG. 10 is a flowchart of a procedure in which a sensor is unregistered in the system for dependency management, according to an embodiment of the present invention.

FIG. 10 is a flowchart of a procedure in which a sensor is unregistered in the system 400 for dependency management, according to an embodiment of the present invention.

The sensor management module 410 requests the dependency management module 430 to unregister the sensor in operation S1005, the dependency management module 430 requests and acquires information regarding an observation information object that manages observation information observed by the sensor to be unregistered in operations S1010 and 1015. The dependency management module 430 requests the observation information object to unregister the sensor and deactivate the observation information object in operation S1020. The observation information object unregisters the sensor and checks whether any other sensor observing knowledge corresponding to the observation information object requested to be deactivated exists in operation S1025. If any other sensor observing the corresponding knowledge exists, the procedure of unregistering the sensor for dependency management ends. However, if no other sensor observing the corresponding knowledge exists, the observation information object is deactivated in operation S1025. Next, the observation information management module 420 inspects the state of a CAS using the deactivated observation information object in operation S1030 and requests the dependency management module 430 to examine dependency with respect to every CAS using the deactivated observation information object in operation S1035. Then, the dependency management module 430 performs dependency examination in operation S1040. A CAS for which dependency has not been detected is not deactivated. When the dependency has been detected, the dependency management module 430 reports to the CAS management module 450 that a corresponding CAS has dependency in operation S1045. The CAS management module 450 sets the CAS having dependency to a resolved state in operation S1050. The dependency management module 430 acquires information regarding an observation information object used by the CAS set to the resolved state in operations S1055 and S1060 and requests the observation information management module 420 to deactivate the observation information object in operation S1065. When any other CAS using the observation information object does not exist, the observation information management module 420 deactivates the observation information object in operation S1070 and requests the sensor management module 410 to deactivate the sensor requested to be unregistered in operation S1075. Then, the sensor management module 410 deactivates the sensor in operation S1080.

Figure 11:
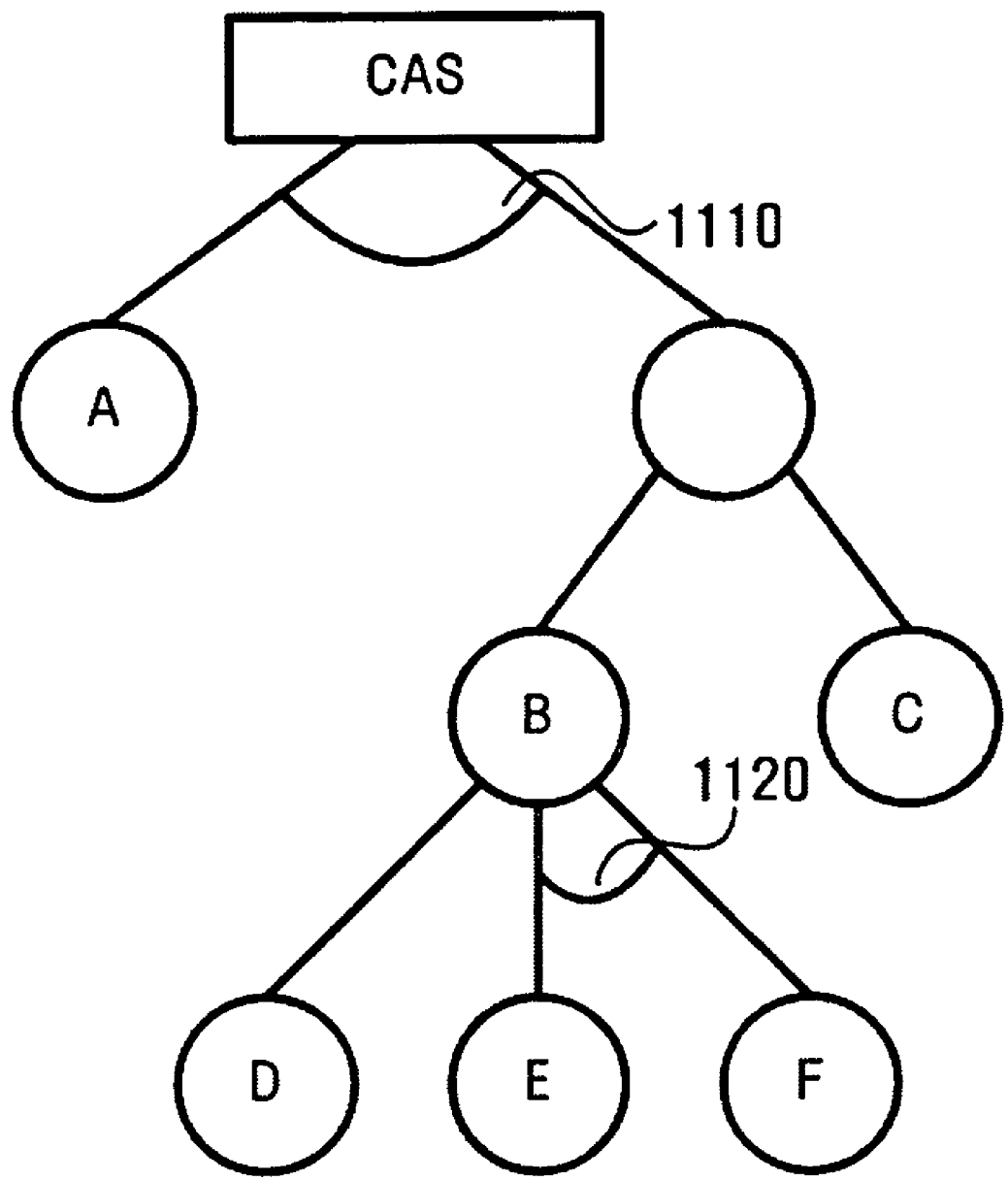
FIG. 11 illustrates a dependency map in a system for dependency management, according to an embodiment of the present invention.

FIG. 11 illustrates a dependency map in a system for dependency management, according to an embodiment of the present invention.

The dependency map is a data structure that defines a relationship between a context of a CAS and an observation information object of a sensor. The dependency map may be configured using a list or an AND-OR graph.

When a context can be determined only when all observation information constituting a context can be observed, the dependency map can be configured in a list form. Generally, a context can be expressed as a function of observation information and a dependency map between the context and an observation information object can be created using the function. An example of a method of creating a dependency map by analyzing a context will be described below.

When a context is defined as a simple function of an observation information object, for example, "Context=Function (01, 02, 03)", observation information objects 01, 02, and 03 are added to an observation information list on which a CAS depends.

When the context is expressed in complex language, a term in an expression formula corresponds to an observation information object. Accordingly, all of the terms in the expression formula are added to the observation information list. For example, when the context is expressed like "Context=Temperature>25 and not Cooling" indicating that temperature is at least 25° and an air conditioner does not operate, "Temperature" and "Cooling" are observation information objects on which the CAS depends and are added to the observation information list.

Meanwhile, when the context is expressed in structured query language (SQL) as follows:

SELECT Name, Age from Employee
Where Position="Manager",

"Name", "Age", and "Position" in the Where phrase are added to the observation information list.

In dependency examination using a dependency map configured in a list form, a list corresponding to a context provided by a CAS is searched and each of all observation information objects included in the list is checked to determine whether a sensor observing each observation information object exists. If there is any one observation information object that is not observed by any sensor, it is determined that dependency is present.

Alternatively, a dependency map between a CAS and a sensor may be configured in an AND-OR graph. An example of a method of creating a dependency map in a form of an AND-OR graph will be described below.

When a context is expressed in logical language as follows:
Context=(Temperature>25 or Humidity>80%) and not Cooling, "Temperature", "Humidity", and "Cooling" are observation information objects on which a CAS depends. Here, if "Cooling" and at least one of "Temperature" and "Humidity" are observed, the context is determined and thus the CAS operates. Such OR relation in the logical expression of the context can be expressed as an OR relation in the AND-OR graph.

Meanwhile, in context-aware service, knowledge may be determined by a rule. Here, the knowledge is added via an OR link in the AND-OR graph. For example, when a context and a rule exist as follows:

Context=A^(B ∨C)
D→B
E^F→B, a dependency map configured in a form of the AND-OR graph will be created as shown in FIG. 11. A mark denoted by reference numerals 1110 and 1120 indicates an AND relation. When the logical expression is converted to the AND-OR graph, "NOT" is meaningless.

In the AND-OR graph, each node has a value of "True" or "False". "True" indicates that a node does not have a dependency problem and "False" indicates that a node has the dependency problem. A terminal node has a value that is determined according to the existence or non-existence of a sensor observing observation information. A non-terminal node has a value that is determined by a value of a child node. An AND link is True, when all child nodes are True. An OR link is True when at least one of all child nodes is True. The values of all nodes in the AND-OR graph are determined through a post-order traverse. When a root node has a value of True, it is determined that the CAS does not have a dependency problem. When the root node has a value of False, it is determined that the CAS has the dependency problem.

The system and method for dependency management of the present invention provide at least the following advantages.

When all objects on which a dependent object depends are not secured, the dependent object is not activated. When any dependent object using information provided by an object-depended-on does not exist, the object-depended-on is deactivated. Accordingly, resource dissipation is prevented and system performance is increased.

In concluding the detailed description, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation.

What is claimed is:

1. A system for dependency management, comprising:
   a provider object management module managing a provider object that provides information;
   a consumer object management module managing a consumer object that executes a predetermined task based on the information provided by the provider object;
   an information object management module managing an information object that manages the provider object and the consumer object based on the information;
   a dependency storage module storing dependency information between the provider object and the consumer object; and
   a dependency management module examining dependency between the provider object and the consumer object based on the dependency information that is received from the dependency storage module and controlling activation and deactivation of the provider object and the consumer object according to a result of the dependency examination,
   wherein at least one of the modules is a hardware component,
   wherein if the consumer object management module requests to deactivate the consumer object, the dependency management module inspects whether information used by the consumer object to be deactivated is used by any other consumer object, and when any other consumer object using the information does not exist, the dependency management module controls deactivating the provider object providing the information.

2. The system of claim 1, wherein the information provided by the provider object is knowledge observed by the provider object.

3. The system of claim 1, wherein the provider object is a sensor that observes the information and the consumer object is a context-aware service object (CAS) that determines whether to provide a service based on the information.

4. The system of claim 1, wherein the dependency information is expressed as a list of the information needed to operate the consumer object.

5. The system of claim 4, wherein the dependency examination is performed by checking the information included in the list to determine whether the provider object providing the information exists.

6. The system of claim 1, wherein the dependency information is expressed as an AND-OR graph of the information needed to operate the consumer object.

7. The system of claim 6, wherein the dependency examination is performed by performing a post-order traverse on all nodes included in the AND-OR graph and determining a value of a root node.

8. A system for dependency management, comprising:
   a sensor management module managing a sensor that observes information;
   a context-aware service object (CAS) management module managing a CAS that provides a service when the information satisfies a context corresponding to information determining a service action of the CAS;
   an observed information management module managing observed information which is a target of observation of the sensor and managing the sensor and the CAS based on the observed information;
   a dependency storage module storing dependency information regarding a relationship between the observed information and the context; and
   a dependency management module examining dependency between the observed information and the context based on the dependency information received from the dependency storage module and controlling activation and deactivation of the sensor and the CAS according to a result of the dependency examination,
   wherein at least one of the modules is a hardware component,
   wherein if the CAS management module requests to deactivate the CAS, the dependency management module inspects whether information used by the CAS to be deactivated is used by any other CAS, and when any other CAS using the information does not exist, the dependency management module controls deactivating the sensor observing the information.

9. The system of claim 8, wherein the dependency information is expressed as a list of the information needed for the CAS to determine the context.

10. The system of claim 9, wherein the dependency examination is performed by checking the information included in the list to determine whether the sensor observing the information exists.

11. The system of claim 8, wherein the dependency information is expressed as an AND-OR graph of the information needed for the CAS to determine the context.

12. The system of claim 11, wherein the dependency examination is performed by performing a post-order traverse on all nodes included in the AND-OR graph and determining a value of a root node.

13. A method for dependency management in a dependency management system including a processor, comprising:
   requesting information on all observation information objects used by a consumer object;
   acquiring information on a dependency map corresponding to a context of the consumer object from a dependency storage module, the dependency map indicating a relationship between the context and the observation information objects used by the consumer object, the dependency map being stored in the dependency storage module and the context defining a service action performed by the consumer object;
   examining by the processor, dependency between the consumer object to be activated and a provider object observing and providing information by using the information of the dependency map, wherein the consumer object executes the service action based on the information provided by the provider object; and controlling activation and deactivation of the consumer object and the provider object according to a result of the examination, wherein the examining of the dependency comprises determining, based on the information on the dependency map, whether all of provider objects that observe information needed to determine the context of the consumer object have been registered in the dependency management system, and wherein the controlling of the activation and deactivation comprises activating the provider object and the consumer object when all the provider objects have been registered in the dependency management system, and wherein the provider object is a sensor that observes information and the consumer object is a context-aware service object (CAS) that determines whether to provide a service based on the observed information, and wherein the controlling of the activation and deactivation further comprises activating an observation information object corresponding to the provider object when all the provider objects have been registered in the dependency management system.

14. The method of claim 13, wherein the controlling of the activation and deactivation comprises setting a state of the consumer object to a resolved state when the dependency is detected as the result of the examination.

15. A method for dependency management in a dependency management system including a processor, comprising:

receiving information indicating that a provider object is added to the dependency management system;

requesting restart of a consumer object that is in a resolved state among consumer objects;

acquiring, from a dependency storage module, a dependency map indicating a relationship between a context of the consumer object and an observation information object corresponding to information observed by the provider object and needed to determine the context, wherein the dependency storage module stores the dependency map and the context defines a service action performed by the consumer object;

examining by the processor, dependency between the provider object observing information and the consumer object that is in the resolved state among the consumer objects by using the dependency map; and controlling activation and deactivation of the consumer object according to a result of the examination, wherein the examining of the dependency comprises determining whether all of provider objects that observe information needed to determine the context of the consumer object have been registered in the dependency management system, and wherein the controlling of the activation and the deactivation comprises activating the provider object and the consumer object that is in the resolved state when all the provider objects have been registered in the dependency management system, and wherein the provider object is a sensor that observes the information and the consumer object is a context-aware service object (CAS) that determines whether to provide a service based on the information, and wherein the controlling of the activation and the deactivation comprises activating the observation information object corresponding to the information observed by the provider object when all the provider objects have been registered in the dependency management system.

16. The method of claim 15, wherein the controlling of the activation and deactivation comprises setting a state of the consumer object to a resolved state when the dependency is detected as the result of the examination.

17. The method of claim 15, wherein the controlling of the activation and deactivation comprises activating the provider object and the consumer object when the dependency is not detected.

18. A method for dependency management in a dependency management system including a processor, comprising:

acquiring by the processor, information regarding an observation information object that manages observation information observed by a provider object to be deactivated;

determining whether any other provider object observing information corresponding to the observation information object exists;

deactivating the observation information object if any other provider object observing information corresponding to the observation information object does not exist;

examining dependency of a consumer object using the deactivated observation information object based on a dependency map indicating a relationship between a context of the consumer object and the observation information object, the dependency map being stored in a dependency storage module and the context defining a service action performed by the consumer object;

setting the consumer object to a resolved state and acquiring information on an observation information object used by the consumer object from the dependency storage module if the dependency of the consumer object on the deactivated observation information object is detected according to a result of the examination; and deactivating the observation information object used by the consumer object and deactivating the provider object if any other consumer object using the observation information object used by the consumer object does not exist, wherein the provider object is a sensor that observes the observation information and the consumer object is a context-aware service object (CAS) that determines whether to provide a service based on the observation information.

19. A computer storage medium having a computer readable program recorded therein, the program causing a computer to execute a method for dependency management, the method comprising:

requesting information on all observation information objects used by a consumer object;

acquiring information on a dependency map corresponding to a context of the consumer object from a dependency storage module, the dependency map indicating a relationship between the context and the observation information objects used by the consumer object, the dependency map being stored in the dependency storage module and the context defining a service action performed by the consumer object;

examining dependency between the consumer object to be activated and a provider object observing and providing information by using the information of the dependency map, wherein the consumer object executes the service action based on the information provided by the provider object; and controlling activation and deactivation of the consumer object and the provider object according to a result of the examination, wherein the examining of the dependency comprises determining, based on the information on the dependency map, whether all of provider objects that observe information needed to determine the context of the consumer object have been registered in the dependency management system, and wherein the controlling of the activation and deactivation comprises activating the provider object and the consumer object when all the provider objects have been registered in the dependency management system, and wherein the provider object is a sensor that observes information and the consumer object is a context-aware service object (CAS) that determines whether to provide a service based on the observed information, and wherein the controlling of the activation and deactivation further comprises activating an observation information object corresponding to the provider object when all the provider objects have been registered in the dependency management system.

20. A computer storage medium having a computer readable program recorded therein, the program causing a computer to execute a method for dependency management, the method comprising:

receiving information indicating that a provider object is added to the dependency management system;

requesting restart of a consumer object that is in a resolved state among consumer objects;

acquiring, from a dependency storage module, a dependency map indicating a relationship between a context of the consumer object and an observation information object corresponding to information observed by the provider object and needed to determine the context, wherein the dependency storage module stores the dependency map and the context defines a service action performed by the consumer object;

examining dependency between the provider object observing information and the consumer object that is in the resolved state among the consumer objects by using the dependency map; and controlling activation and deactivation of the consumer object according to a result of the examination, wherein the examining of the dependency comprises determining whether all of provider objects that observe information needed to determine the context of the consumer object have been registered in the dependency management system, and wherein the controlling of the activation and the deactivation comprises activating the provider object and the consumer object that is in the resolved state when all the provider objects have been registered in the dependency management system, and wherein the provider object is a sensor that observes the information and the consumer object is a context-aware service object (CAS) that determines whether to provide a service based on the information, and wherein the controlling of the activation and the deactivation comprises activating the observation information object corresponding to the information observed by the provider object when all the provider objects have been registered in the dependency management system.

21. A computer storage medium having a computer readable program recorded therein, the program causing a computer to execute a method for dependency management, the method comprising:

acquiring information regarding an observation information object that manages observation information observed by a provider object to be deactivated;

determining whether any other provider object observing information corresponding to the observation information object exists;

deactivating the observation information object if any other provider object observing information corresponding to the observation information object does not exist;

examining dependency of a consumer object using the deactivated observation information object based on a dependency map indicating a relationship between a context of the consumer object and the observation information object, the dependency map being stored in a dependency storage module and the context defining a service action performed by the consumer object; setting the consumer object to a resolved state and acquiring information on an observation information object used by the consumer object from the dependency storage module if the dependency of the consumer object on the deactivated observation information object is detected according to a result of the examination; and deactivating the observation information object used by the consumer object and deactivating the provider object if any other consumer object using the observation information object used by the consumer object does not exist, wherein the provider object is a sensor that observes the observation information and the consumer object is a context-aware service object (CAS) that determines whether to provide a service based on the observation information.

* * * * *